July 11, 1933.   A. S. MANCIB   1,917,893
CONTROL APPARATUS
Filed Oct. 24, 1931   3 Sheets-Sheet 1

Inventor
Alvin S. Mancib
by Roberts, Cushman & Woodbury
Attys.

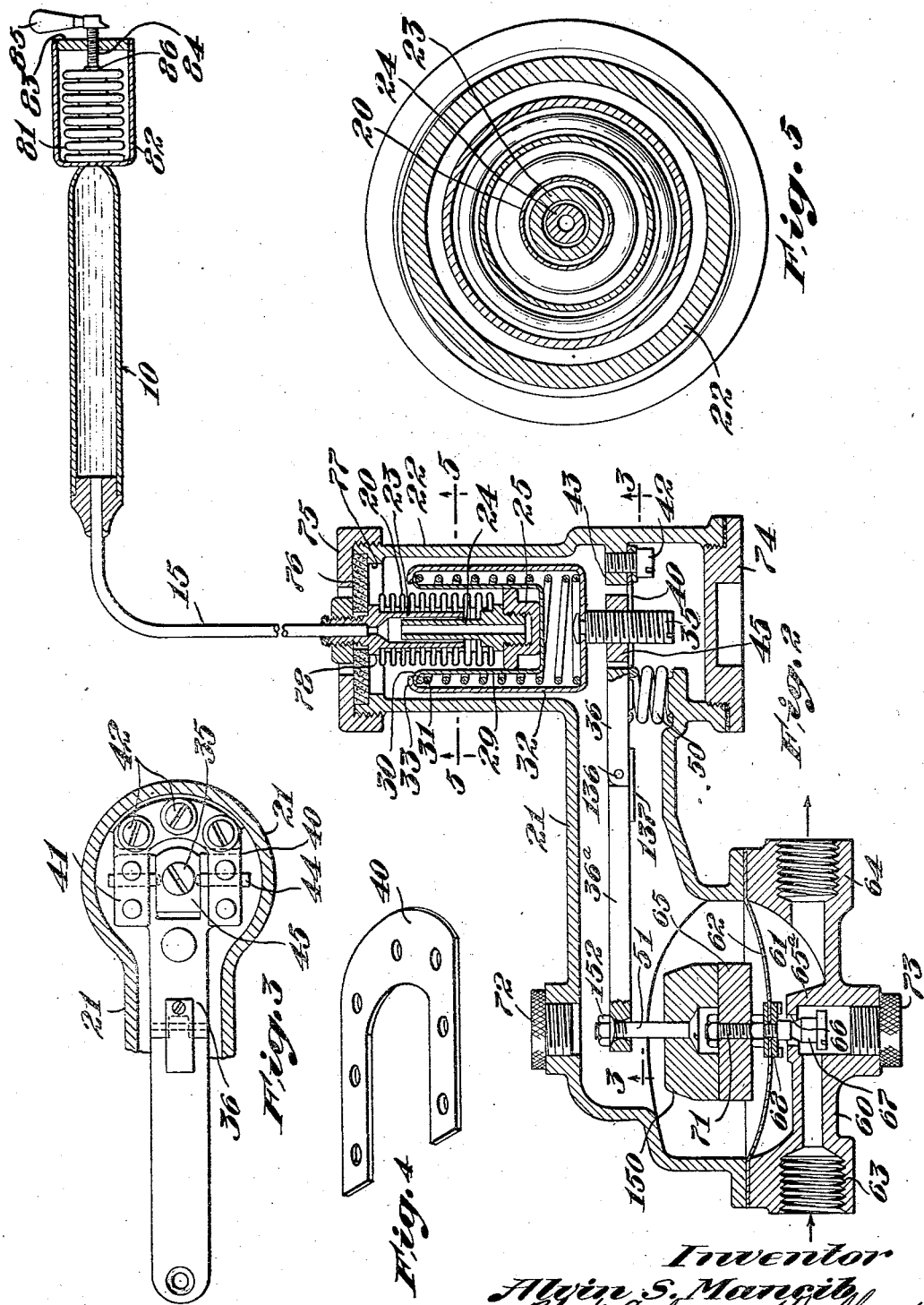

Inventor
Alvin S. Mancib
by Roberts, Cushman & Woodbury
Attys.

Patented July 11, 1933

1,917,893

UNITED STATES PATENT OFFICE

ALVIN S. MANCIB, OF SOMERVILLE, MASSACHUSETTS, ASSIGNOR TO COMSTOCK & WESCOTT, INC., OF BOSTON, MASSACHUSETTS, A CORPORATION OF MASSACHUSETTS

CONTROL APPARATUS

Application filed October 24, 1931. Serial No. 570,824.

This invention relates to control devices, and more particularly to devices of a type adapted to regulate the rate of fluid flow through a duct, such as a duct for supplying gas to a burner.

One aspect of the present invention relates to the combination of temperature responsive control means with a governor for a fuel supply line, such as a gas supply duct. For this purpose a suitable temperature responsive device or system may be provided which is associated with control means to vary the rate of flow of gas through the duct. Preferably the control means is combined with a pressure regulator which is normally effective in permitting the flow of gas at, at least, a predetermined minimum rate. An arrangement of this character may conveniently be employed in conjunction with a refrigerating system, the temperature responsive means, for example, being located in the refrigerator housing and preferably in the region of the cooler itself.

Preferably the system includes a chamber or metal bulb of substantially constant volume within the refrigerator housing and an expansible-contractible chamber, such as an expansible bellows, adjoining the regulating valve, these chambers being connected by a duct of restricted internal diameter and cooperating therewith in forming a hermetically sealed system containing liquid, such as a suitable light-bodied oil. A movable control member is arranged adjoining the expansible-contractible chamber and is movable in response to a change in volume of that chamber, this control member in turn being arranged to affect the position of the valve which is associated with the gas line.

Further aspects of the invention relate to features and details of a control device of this character which make it particularly suitable for employment with a refrigerating system having a control valve arranged at some distance from the region, the temperature of which controls the position of the valve. Thus it is advantageous in a device of this character to employ liquid in the hermetically sealed system, since the duct between the chambers may be of considerable length and liquid is much less sensitive to changes in the temperature of this duct than is a gaseous medium and in general is a more stable and satisfactory operating medium.

Since it is desirable to have a considerable change in the volume of the expansible-contractible chamber in response to a comparatively small change in the temperature of the cooler, I provide a special arrangement for decreasing the effective volume of the expansible-contractible chamber. For this purpose I preferably provide a substantial extension of the duct within the expansible-contractible chamber or bellows and provide a second element in loose telescoping relation therewith; not only do the extension and element cooperate in reducing the effective volume of the bellows, but they are also effective in supporting and reinforcing the latter against undue distortion or lateral strains.

Since the change of liquid volume within the system is comparatively small in response to an appreciable temperature change, I preferably provide a lever arrangement between the expansible-contractible bellows and the regulating valve. For this purpose, a suitable movable control member or lever has one end connected to a fulcrum support and its opposite end engageable with an extension of the valve, an element disposed near the fulcrum end of the lever being actuable by the expansible-contractible chamber to swing the lever and thus to move the valve. A system of this character therefore is adapted to cause appreciable movement of the regulating element or valve in response to a minute change in the volume of the contained liquid, which will occur in response to a very small change in the temperature of the liquid. It is therefore desirable to provide means protecting the system against the effect of an abnormal change in the temperature of the liquid. For this purpose I preferably provide yieldable means between the expansible-contractible chamber and the control member which permits unusual expansion of the former without undue movement of the latter.

A further aspect of the invention relates to the association of a manual control with the hermetically sealed fluid containing system, this control being operable independently of the automatic temperature responsive control. Thus the positioning of the valve may be varied not only by the automatic control, but also by the manual regulator. Furthermore, the governor itself is arranged normally to permit the flow of gas at at least a predetermined rate or pressure to the burner, the automatic control and the manual control both being operable to increase this predetermined rate as conditions may require. Thus the amount of energy supplied to the refrigerating system by the burner may be automatically increased when the cooler temperature rises, thus causing an increase in the refrigerating effect and tending to maintain the cooler at a uniform low pressure, while the manual regulator may be employed to cause an increase in the refrigerating rate and consequently a more rapid rate of refrigeration when an unusually low cooler temperature is desired for any purpose as, for example, for rapid freezing of ice cakes.

Referring to the accompanying drawings,

Fig. 2 is a broken sectional view of my improved control device;

Fig. 3 is a section indicated by line 3—3 of Fig. 2;

Fig. 4 is a perspective view of one part of the portion of the assembly shown in Figs. 2 and 3;

Fig. 5 is a section indicated by line 5—5 of Fig. 2;

Figure 1:
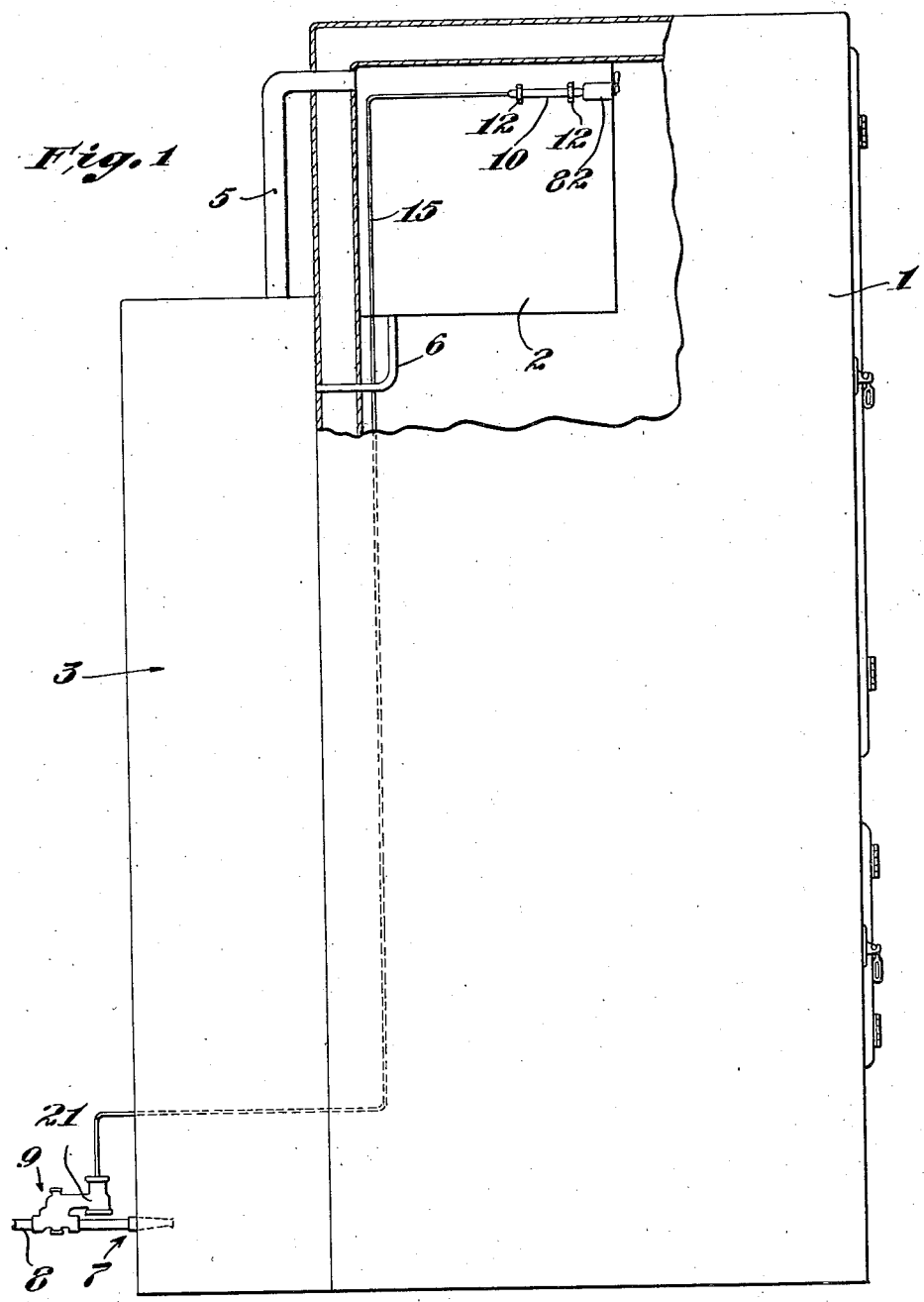
Fig. 1 is a view, somewhat diagrammatic in character, of a refrigerator housing showing a refrigerating system to which my control device is applied, the system having a gas burner and including a cooler within the refrigerator housing.
Figure 6:
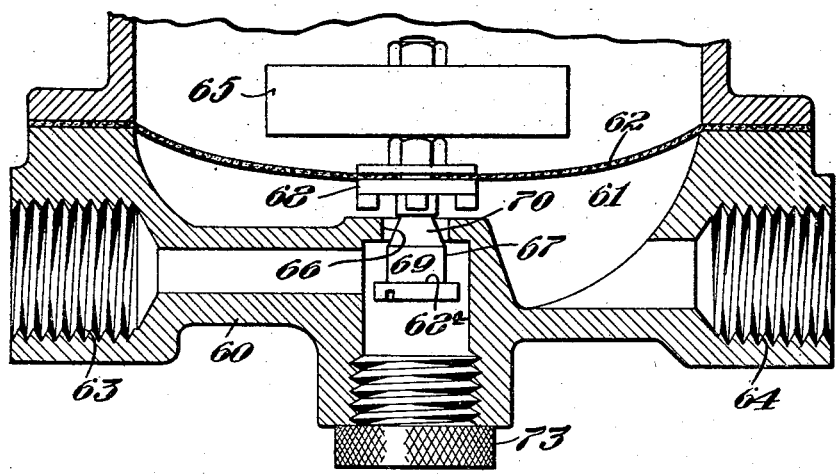
Fig. 6 is enlarged vertical section portion of the diaphragm casing.
Figure 7:
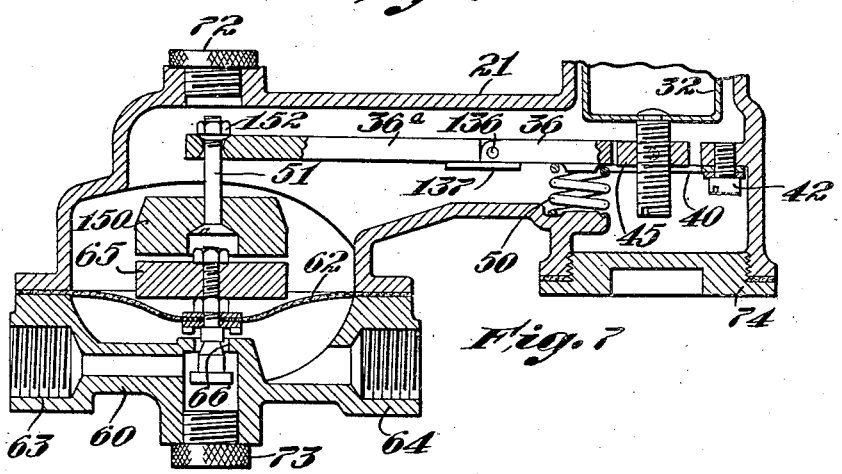
Figs. 7 and 8 are sectional views of a portion of the control device showing different positions of the parts thereof.

Referring to the accompanying drawings, numeral 1 designates a refrigerator housing which may contain a cooler 2 which forms part of a refrigerating system, designated in general by the numeral 3, the cooler being connected to the remainder of the system by a vapor outlet pipe 5 and a refrigerant liquid inlet pipe 6. As shown, the cooler preferably is arranged in the upper part of the refrigerator housing, and the main portion of the refrigerating system 3 may be disposed behind the housing 1. A gas burner 7 may be disposed in the lower part of the system and may be provided with a gas supply duct 8 with which the governor assembly 9 is associated.

The refrigerating system 3 may be of any suitable type, preferably being of a design that receives its energy from a gas burner such, for example, as the system disclosed in Patent No. 1,761,551 to Eastman A. Weaver, it being a common characteristic of systems of this character that the refrigerating effect varies in response to the heat supplied by the burner.

The control device which more particularly forms the subject matter of the present invention may be associated with the governor assembly 9 and may include a metal bulb 10, Figs. 1 and 2, disposed within the refrigerator housing and preferably secured by clips 12 to the upper, vapor-containing portion of the cooler 2. The metal bulb preferably is provided with rigid walls and thus has a substantially constant volumetric capacity. This bulb is connected by a metal tube 15 of restricted internal diameter to an expansible-contractible chamber or metal bellows 20 which is disposed in the housing 21 that encloses the governor assembly (Fig. 2). The bellows 20 preferably may be contained within a cylindrical, upwardly projecting extension 22 of housing 21. Preferably the end of duct 15 is in the form of a metal bushing 23 which projects downwardly into the chamber 20 and which receives a tubular member 24 in loose telescoping engagement therewith, the member 24 being secured to the bottom of the bellows, and the bushing 23 being secured to the top thereof.

As shown in Fig. 2, the members 22 and 23 cooperate in occupying a major portion of the interior of the bellows so that the effective capacity of the same is materially reduced by these telescoping elements. The chamber 10, duct 15 and bellows 20 form a hermetically sealed system. This system preferably is entirely filled with liquid such as a light oil, for example, a light hydrocarbon such as Russian oil.

The lower part of the tubular element 24 has a shoulder resting upon the annular upper surface of a metal member 25. The lower part of the bellows and the member 25 are disposed within a sheet metal cup 29 which has an outturned lip 30 normally resting upon a coiled compression spring 31. The latter is disposed within an outer sheet metal cup 32 which has an inturned marginal flange 33 against which the spring may hold the flange 30 of the inner cup. The outer cup 32 receives the upper end of an adjusting screw 35 which is threaded into an opening in a block 45 mounted on pintles 44 within the forked end of the control member or lever 36. The latter preferably may be disposed substantially horizontally in the casing 9 and may be supported by a substantially U-shaped fulcrum spring 40, the bight portion of which is secured by the screws 42 to an inwardly extending flange 43 at the end of casing 21, while the projecting legs of the spring are secured by screws 41 to the end of lever 36 at either side of the adjusting screw 35 and block 45, Fig. 3.

Figure 8:
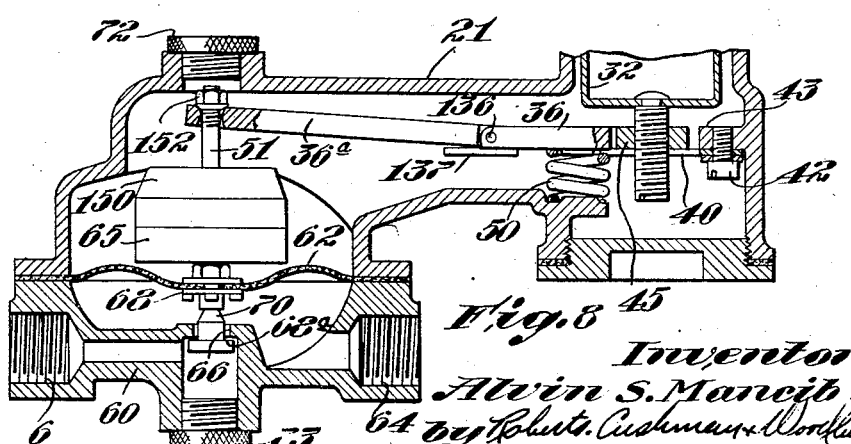

A coil spring 50 engages cylindrical nubs upon the lever and casing 21 and tends to swing the lever 36 upwardly about the fulcrum spring 40, thus holding the bottom of the cup 32 against spring 31. Lever 36 is provided with an extension 36ª which is in loose engagement with a spindle 51 extending upwardly from a weight 150, a nut 152 upon the upper end of the spindle having a convexly curved surface to engage the end of the lever extension 36ª. A pivot 136 connects the lever parts 36 and 36ª and a fixed stop member 137 prevents the extension 36ª from swinging downwardly beyond a position in alignment with the member 36, although the part 36ª may swing upwardly as shown, for example, in Fig. 8. The weight 150 is disposed above an annular weight 65 that is carried by a leather diaphragm 62 which extends over the gas chamber 61. The governor includes a lower casing portion 60 providing the chamber 61 and being secured to the casing 21.

An inlet 63 and an outlet 64 are connected to the chamber 61 by suitable passages, but a wall or partition 65ª is arranged between the inlet passage 63 and the chamber 61, which is connected directly to the outlet passage 64. A valve opening 66 is provided in the partition 65ª between the inlet passage and the chamber 61.

The spindle 71 extends through the annular weight and through an opening in the diaphragm 62, a valve 67 being mounted upon the lower part of the spindle and a castellated vent washer 68 being secured against the diaphragm above the partition 66. The valve 67 is provided with an annular shoulder 68ª, and a cylindrical body portion 69 and a frusto-conical upper portion 70. The cylindrical portion 69 is slightly smaller than the opening 66 and is adapted to move into the same to permit a limited flow of gas between the cylindrical valve portion 66 and the wall of the opening, while the annular shoulder 68 may engage the lower surface of the partition to prevent further flow of gas under abnormal pressures. Normally the frusto-conical portion 70 is disposed adjoining the lower edge of the opening to permit variation in the amount of gas flow in accordance with the exact height of this frusto-conical portion in relation to the opening. When the operation of the system has been interrupted, for example, due to shutting off the flow of gas to the diaphragm chamber 61, the weight 65 causes the castellated washer 68 to rest upon the adjoining part of the housing, the castellations, however, permitting gas flow from the inlet 63 into the chamber 61 so that the diaphragm may be lifted and normal flow of the gas resumed.

A suitable screw plug 72 may be disposed above the spindle 51 and the end of lever extension 36ª to permit ready access to this portion of the device, and a similar screw cap 73 may be disposed below the valve to permit access thereto. Similarly a screw plug 74 may be disposed below the adjusting screw 35 and the screws 42, while a screw-threaded cap 75 is disposed above the cylindrical extension 22 of the casing in which the expansible-contractible bellows is located, a washer 76 of compressible material being located beneath this cap and engaging an annular flange 77 upon the inside of the casing wall and a shoulder 78 upon the member 23.

Preferably means is also associated with the liquid containing system to permit manual variation of the volume of the expansible-contractible chamber 20. For this purpose a chamber 82 may be mounted at the end of bulb 10 and contain an expansible-contractible bellows 81 communicating with the bulb. The outer end 83 of chamber 82 preferably is provided with an opening in which a screw-threaded member 84 is received, the outer end of this member being provided with a manual control handle 85 and its inner end engaging a button 86 which is secured to the end of bellows 81. Thus the handle 85 may be effective in bringing the threaded spindle 84 into firm engagement with the button 86 and causing the bellows 81 to be compressed against the opposite end of the casing 82, thus causing the flow of liquid to the expansible-contractible chamber 20 and an increase in the volume of the latter.

The manual control device may be located at any convenient point and, as shown in Fig. 1, is disposed upon the side of the cooler and is readily accessible when the refrigerator door 90 is opened.

In the operation of apparatus of this character, gas is received under pressure by the gas governor 60. This gas passes through the inlet 63 and tends to flow upwardly into chamber 61, the valve 67 being effective in throttling the gas flow and thus reducing the pressure of the gas as it passes into chamber 61. The pressure of the gas in chamber 61 tends to lift the diaphragm 62 against the pressure of the weight 65.

If the control lever 36, 36ª spaced from spindle 51 holds weight 150, the gas pressure in chamber 61 will reach a point of equilibrium when this pressure is sufficient to react against the effect of the weight 65 tending to depress the diaphragm. If the pressure of the gas entering through inlet 63 falls, the diaphragm and weight will fall slightly until there is an increased flow of gas through the valve opening, which again permits the balancing of the pressure of the weight in chamber 61. Accordingly the governor, when acting independently of the control lever 36, is effective in maintaining the gas flowing through outlet 64 to the burner 7 at a uniform minimum pressure as long as the pressure of the gas received from the mains is above a minimum point.

The temperature of the relatively large volume of liquid in the primary chamber or bulb 10 substantially determines the condition of the expansible-contractible chamber 20. Thus when the temperature of the cooler rises and the temperature of the liquid within the primary chamber 10 also rises, liquid will flow through duct 15 to the expansible-contractible chamber 20, thus expanding the latter. This imposes a pressure upon the inner cup 29 which in turn is effective through the spring 31 in pressing the outer cup 32 downwardly against adjusting screw 33. The latter tends to swing the lever 36 about the fulcrum spring 40 against the action of the compression spring 50, thus, as shown, in Fig. 8, tending to permit the weight 150 to rest upon weight 65 and open the governor valve 67 beyond the predetermined minimum position determined by the weight 65. Accordingly an increase of the temperature of the interior of the refrigerating casing, and particularly of the region adjoining the cooler, above a predetermined minimum tends to cause the flow of gas to the burner at a rate above the predetermined minimum rate of flow.

Downward pressure imposed upon the lever 36 through the adjusting screw 33 by the expansible chamber 20 is opposed by the spring 50 and aided by the weight 150. However, the pressure of gas upon the diaphragm 62 under normal operation conditions may often be effective in supporting a part of the weight 150 so that a larger portion of the pressure of spring 50 is effective in opposing the downward thrust received through adjusting screw 33. Thus although the member 150 may contact the member 65, the spring 50 may support a part of the weight of member 150, the remainder thereof being supported through its contact with the member 65 by the upward pressure of the gas upon the diaphragm 62, thus, as the volumetric capacity of bellows 20 gradually increases, the weight 150 may contact the weight 65 but impose but a slight pressure thereon this pressure gradually increasing as the bellows expand further and thus causing a wider opening of the valve 66 so that greater energy is supplied to the refrigerating system. Under conditions of abnormal gas pressure, as for example sudden surges of pressure in the gas mains, the parts may assume the position shown in Fig. 8, the diaphragm 61 being raised so that it supports both weights 65 and 150, the lever extension 36ª being permitted to swing upwardly and downward thrust received from the bellows being opposed only by the spring 50. Thus under conditions of abnormal gas pressure, the weight 150 may aid the weight 65 in tending to depress the diaphragm 61.

The hand control device 85 also may be actuated to cause expansion of the control bellows 20 and thus cause the lever 36 to depress the spindle 51 and the valve 67, causing the latter to open beyond the minimum position determined by the conditions within the governor casing itself. Thus the turning of the control lever may be effective in causing additional gas flow to the burner 7 and an increased rate of refrigeration when desired as, for example, to provide rapid freezing.

It is thus evident that this control is not only adapted to compensate automatically for variations in gas line pressure and to maintain the gas flowing to the burner at least at a predetermined minimum pressure, but that it also automatically increases the rate of flow in response to a condition of the region being refrigerated which makes an additional rate of refrigeration desirable. Thus the control device tends automatically to maintain the region of the cooler at a substantially uniform low temperature. Furthermore, this device is also arranged through the manual control 85 to permit an increased rate of refrigeration whenever desired independently of the temperature of the interior of the refrigerator.

The adjusting screw 35, which may be readily reached by removal of the screw plug 74, may be adjusted to vary the temperature of the bulb 10 which may be effective to cause the lever 36 to effect an additional opening of the valve 67 and increase in gas flow. The entire casing 9 is so arranged that leakage of gas into the room is prevented, as, for example, if there should be a leak from the gas chamber 61 into the main portion of the housing which contains the spindle 51, lever 36, and the expansible-contractible element.

The arrangement of the screw-threaded cover or cap 75 permits the ready removal of the expansible-contractible chamber 20 as well as the cups 29 and 32 and the spring 31 so that ready access to these parts is afforded when desired. The spring 31 is particularly effective in protecting the device against damage due to an abnormal increase in pressure and temperature, as for example, when the chamber 10 is exposed to a relatively high temperature. Under these conditions the increase in volume of the bellows will be effective in causing the lever 36 to swing to a position wherein the coils of the spring 50 are in direct engagement with each other, so that the spring 50 then acts as a stop to prevent further movement of control lever 36; thereupon continued expansion of the bellows is effective in compressing the spring 31 without damage to other parts of the device, such as the diaphragm, and also avoiding danger of rupture of the liquid-containing system due to abnormally high pressures therein.

The provision of a hydraulic control system containing liquid is particularly advantageous when the duct 15 is necessarily quite long as, for example, when the casing 9 is spaced at a considerable distance from the primary chamber 10, since the temperature of the liquid within the tube does not have an objectionably marked effect upon the operation of the device as would be the case were a gas to be employed. In fact, slight expansion of chamber 20 due to the increase in the temperatures of the air surrounding tube 15 is advantageous, since such a rise in temperature ordinarily may result in an increase in the condenser temperature and pressure, this requiring a greater pumping capacity to maintain a given rate of refrigeration. Furthermore, the provision of the telescoping elements 23 and 24 within the control bellows permits the device to be much more sensitive to slight changes in the temperature of the primary control chamber 10 or to changes in the volume of the bellows 81, such, for example, as may occur due to the turning of the lever 84 through a fraction of a turn, than would be the case were the control bellows entirely filled with liquid.

It should be understood that the present disclosure is for the purpose of illustration only and that this invention includes all modification and equivalents which fall within the scope of the appended claims.

I claim:

1. Apparatus of the class described comprising a fluid duct, a valve controllable to vary the rate of flow through said duct, a primary chamber of substantially constant volume, an expansible-contractible chamber, a duct connecting said chambers, said chambers and duct being included in a hermetically sealed system which is filled with liquid, control means actuable in response to change in volume of the expansible-contractible chamber to vary the position of the valve and thus effect variation in the rate of fluid flow through said duct in response to the temperature of said primary chamber, and regulating means associated with said valve to effect its opening to a sufficient degree to permit a predetermined pressure of fluid passing from the valve independently of the control means.

2. Apparatus of the class described comprising a refrigerating system including a cooler, a gas burner supplying energy to the system, a gas supply duct connected to the burner, a gas pressure regulator associated with said duct to determine the pressure of gas supplied to the burner, a hermetically sealed system containing liquid, said system including a primary chamber of substantially constant volume in the region of the cooler, an expansible-contractible chamber in the region of the regulator, a duct of restricted internal diameter connecting said chambers, and control means between the regulator and the expansible-contractible chamber, so that the regulator is automatically adjusted to permit greater gas flow in response to expansion of the expansible-contractible chamber, whereby the amount of gas supplied to the burner is automatically increased in response to an increase in the temperature of said region.

3. Apparatus of the class described comprising a gas duct, a gas chamber connected to the duct, a diaphragm extending over said gas chamber, a valve connected to the diaphragm and arranged to vary flow from the duct to the chamber in response to the position of the diaphragm, a weight connected to the diaphragm and tending to depress the same and the valve connected thereto, said chamber being provided with an outlet, a second weight disposed above the first weight, a temperature responsive control means associated with said second weight yieldably to vary the pressure with which it presses downwardly upon the first weight whereby the gas flowing through the outlet is controlled in response to the temperature-responsive control means while the arrangement of the valve and first weight permits the flow of gas through the outlet to be maintained at a minimum for any given condition of the secondary control means.

4. Apparatus of the class described comprising a gas duct, a gas chamber connected to the duct, a diaphragm extending over said gas chamber, a valve connected to the diaphragm and arranged to vary flow from the duct to the chamber in response to the position of the diaphragm, a weight connected to the diaphragm and tending to depress the same and the valve connected thereto, said chamber being provided with an outlet, a second weight disposed above the first weight, a secondary temperature responsive control means associated with said second weight yieldably to vary the pressure with which it presses downwardly upon the first weight whereby the gas flowing through the outlet is controlled in response to the secondary control means while the arrangement of the valve and first weight permits the flow of gas through the outlet to be maintained at a minimum for any given condition of the secondary control means, said secondary control means comprising a temperature responsive member adjoining a region spaced from the gas chamber and means extending from said region to the region of the gas chamber, said last named means being somewhat responsive to the temperature of the surrounding medium, whereby the effect of the secondary control means upon the valve is dependent primarily upon the temperature of said first named region, but is also somewhat dependent upon the temperature of the air between said regions.

5. Control apparatus of the class described comprising a fluid containing system including a chamber of substantially constant volume, an expansible-contractible chamber and a duct therebetween, a swinging lever movable in response to expansion of said last named chamber, a spring opposing said movement of the lever, an extension of the lever articulated thereto and movable in one direction in relation to the lever, stop means preventing such a movement in the opposite direction, a weight normally supported by the end of said lever extension, a gas chamber, a diaphgram extending over the gas chamber, said gas chamber having an inlet, a valve connected to the central portion of the diaphragm and arranged to vary the effective cross section of the inlet, said weight being arranged to impose different pressures upon the diaghragm and to effect variable opening of the valve in response to expansion or contraction of the expansible means.

6. Apparatus of the class described comprising a fluid containing system, said system including a chamber of substantially constant volume, an expansible contractible chamber, and a connecting duct therebetween, a support, a lever having one end fulcrumed upon this support, means between the last named chamber and the lever tending to swing the outer end of the latter in relation to the fulcrum, a spring between the support and the lever opposing the swinging movement of the lever in response to expansion of the last named chamber, a lever extension articulated to the lever, stop means arranged to permit the extension to swing in relation to the lever when the lever is moved due to expansion of the last named chamber but to prevent a relative movement between the lever and its extension beyond a predetermined point in the opposite direction, a gas chamber having an inlet and an outlet, a diaphragm extending over the gas chamber, a valve connected with the central portion of the diaphragm and associated with the inlet to vary the flow of gas into the chamber, and a weight adapted to be supported by the lever extension but to impose variable pressure upon the diaphragm in response to variations in the volume of the expansible-contractible chamber.

7. Apparatus of the class described comprising a fluid containing system, said system including a chamber of substantially constant volume, an expansible-contractible chamber and a connecting duct therebetween, a support, a lever having one end fulcrumed upon this support, means between the last named chamber and the lever tending to swing the outer end of the latter in relation to the fulcrum, a spring between the support and the lever opposing the swinging movement of the lever in response to expansion of the last named chamber, a lever extension articulated to the lever, stop means arranged to permit the extension to swing in relation to the lever when the lever is moved due to expansion of the last named chamber but to prevent relative movement between the lever and its extension beyond a predetermined point in the opposite direction, a gas chamber having an inlet and an outlet, a diaphragm extending over the gas chamber, a valve connected with the central portion of the diaphragm and associated with the inlet to vary the flow of gas into the chamber, a weight adapted to be supported by the lever extension but to impose variable pressure upon the diaphragm in response to variations in the volume of the expansible-contractible chamber, and a second weight below the first weight and carried by the diaphragm, said second weight being movable into and out of contact with the first weight whereby gas flow through the chamber may be automatically maintained at a predetermined minimum when the weights are out of contact with each other and whereby flow of gas may be increased when pressure is imposed by the first weight upon the second weight.

8. Apparatus of the class described, comprising a closed, liquid-containing system including a chamber of substantially constant volume, an expansible-contractible bellows, a duct connecting the chamber and one end of the bellows, a cup-like member engaging the opposite end of the bellows, said member having an outstanding lip, an outer cup member having an inturned lip engageable with the first-named lip, a coil spring surrounding the first member and engaging its lip and the end of the second member, thereby tending yieldably to hold the lips in contact, a movable control member actuable by said outer cup member, and a stop to limit the movement of said member, whereby the spring may be compressed in response to unusual expansion of the bellows.

Signed by me at Boston, Massachusetts this 22nd day of October 1931.

ALVIN S. MANCIB.